United States Patent [19]

Aldridge et al.

[11] 4,196,072

[45] Apr. 1, 1980

[54] HYDROCONVERSION PROCESS

[75] Inventors: Clyde L. Aldridge; Roby Bearden, Jr., both of Baton Rouge, La.

[73] Assignee: Exxon Research & Engineering Co., Florham Park, N.J.

[21] Appl. No.: 909,200

[22] Filed: May 23, 1978

[51] Int. Cl.$^2$ .................. C10G 1/06; C10G 13/02
[52] U.S. Cl. ..................................... 208/10; 208/108
[58] Field of Search ................................. 208/10, 108

[56] References Cited

U.S. PATENT DOCUMENTS

| 3,161,585 | 12/1964 | Gleim et al. | 208/264 |
|---|---|---|---|
| 3,331,769 | 7/1967 | Gatsis | 208/210 |
| 3,657,111 | 4/1972 | Gleim | 208/108 |
| 3,824,178 | 7/1974 | Wald | 208/10 |
| 4,066,530 | 1/1978 | Aldridge et al. | 208/112 |
| 4,077,867 | 3/1978 | Aldridge et al. | 208/10 |

*Primary Examiner*—Delbert E. Gantz
*Assistant Examiner*—William G. Wright
*Attorney, Agent, or Firm*—Marthe L. Gibbons

[57] ABSTRACT

In the hydroconversion of carbonaceous materials such as hydrocarbonaceous oils and coal or mixtures thereof, in which inorganic poly acids comprising molybdenum or tungsten or salts thereof are used as catalyst precursors which are converted to catalysts, the use of a combination of phosphoric acid and said poly acids or salts thereof as catalyst precursor wherein the amount of phosphoric acid is such as to provide from about 0.5 to about 3.5 atoms of phosphorus per atom of molybdenum or tungsten results in a catalyst having improved activity.

25 Claims, 2 Drawing Figures ions that contaminants in the oil

HYDROCONVERSION PROCESS

BACKGROUND OF THE INVENTION

1. Field of the Invention

This invention relates to an improvement in a process for converting a carbonaceous material such as a hydrocarbonaceous oil, coal or mixtures thereof, in the presence of hydrogen and a molybdenum or tungsten-containing catalyst prepared from a molybdenum or tungsten-containing inorganic poly acid, such as heteropoly acids and isopoly acids of molybdenum or of tungsten and salts of these acids. The terms "isopoly acids" and "heteropoly acids" are used herein in accordance with the definitions given in Advanced Inorganic Chemistry, 3rd edition by F. A. Cotton & Geoffrey Wilkinson, Interscience Publisher, New York, pages 950 to 957.

2. Description of the Prior Art

Hydrorefining processes utilizing catalysts in admixture with a hydrocarbonaceous oil are well known. The term "hydrorefining" is intended herein to designate a catalytic treatment in the presence of hydrogen, of a hydrocarbonaceous oil to upgrade the oil by eliminating or reducing the concentration of contaminants in the oil such as sulfur compounds, nitrogenous compounds, metal contaminants and/or to convert at least a portion of the heavy constituents of the oil, such as asphaltenes or coke precursors, to lower boiling hydrocarbon products and to reduce the Conradson carbon residue of the oil.

U.S. Pat. No. 3,161,585 discloses a hydrorefining process in which a petroleum oil chargestock containing a colloidally dispersed catalyst selected from the group consisting of metals of Group VB and Group VIB, an oxide of said metal or a sulfide of said metal is reacted with hydrogen at hydrorefining conditions. This patent teaches that the concentration of the dispersed catalyst, calculated as the elemental metal, in the oil chargestock is from about 0.1 weight percent to about 10 weight percent of the initial chargestock. Furthermore, this patent discloses that phosphomolybdic acid as catalyst precursor, can be added to the oil chargestock as a solution in water, alcohol or ether.

U.S. Pat. No. 3,331,769 discloses a hydrorefining process in which a metal component (Groups VB, VIB and iron group metal) colloidally dispersed in a hydrocarbonaceous oil is reacted in contact with a fixed bed of a conventional supported hydrodesulfurization catalyst in the hydrorefining zone. The concentration of the dispersed metal component which is used in the hydrorefining stage in combination with the supported hydrodesulfurization catalyst ranges from 250 ppm to 2500 ppm.

U.S. Pat. No. 3,657,111 discloses a process for hydrorefining an asphaltene-containing hydrocarbon chargestock which comprises dissolving in the chargestock a hydrocarbon-soluble oxovanadate salt and forming a colloidally dispersed catalytic vanadium sulfide in situ within the chargestock by reacting the resulting solution, at hydrorefining conditions, with hydrogen and hydrogen sulfide. It is also known to convert coal to liquid products by hydrogenation of coal which has been impregnated with an oil soluble metal naphthenate or by hydrogenation of coal in a liquid medium, such as an oil having a boiling point range of 250° to 325° C., containing an oil soluble metal naphthenate, as shown in Bureau of Mines Bulletin No. 622, published 1965, entitled "Hydrogenation of Coal in the Batch Autoclave," pages 24-28. Concentrations as low as 0.01% metal naphthenate catalyst, calculated as the metal, were found to be effective for the conversion of coal.

U.S. Pat. No. 4,066,530 discloses the use of phosphomolybdic acid as catalyst precursor in combination with a solid iron component in the hydroconversion of hydrocarbonaceous oils.

The term "hydroconversion" with reference to the oil is used herein to designate a process conducted in the presence of hydrogen in which at least a portion of the heavy constituents and coke precursors (as measured by Conradson carbon residue) of the hydrocarbonaceous oil is converted to lower boiling hydrocarbon products.

The term "hydroconversion" with reference to coal is used herein to designate conversion of coal to liquid hydrocarbons in the presence of hydrogen.

It has now been found that utilization of a combination of phosphoric acid and a poly acid comprising a metal constituent selected from the group consisting of molybdenum, tungsten and mixtures thereof or a salt of said poly acid as catalyst precursor in a specified ratio of atoms of phosphorus per atom of said metal constituent in the hydroconversion process will result in normally liquid hydrocarbons having a decreased sulfur content.

SUMMARY OF THE INVENTION

In accordance with the invention there is provided, in a process for the hydroconversion of a carbonaceous material which comprises: (a) forming a mixture of said carbonaceous material and a poly acid selected from the group consisting of isopoly acids and heteropoly acids and salts thereof, wherein said poly acid comprises at least one metal constituent selected from the group consisting of molybdenum and tungsten; (b) converting said poly acid to a catalyst within said mixture in the presence of a hydrogen-containing gas by heating said mixture to an elevated temperature; (c) reacting the resulting mixture containing said catalyst with hydrogen under hydroconversion conditions; and (d) recovering a normally liquid hydrocarbon product, the improvement which comprises: adding said poly acid and phosphoric acid to said mixture, said phosphoric acid being added in an amount such as to provide a ratio from about 0.5 to about 3.5 atoms of phosphorus per atom of said metal constituent, said catalyst of step (b) being the conversion product of said phosphoric acid and said poly acid.

DETAILED DESCRIPTION OF THE INVENTION

Figure 1:
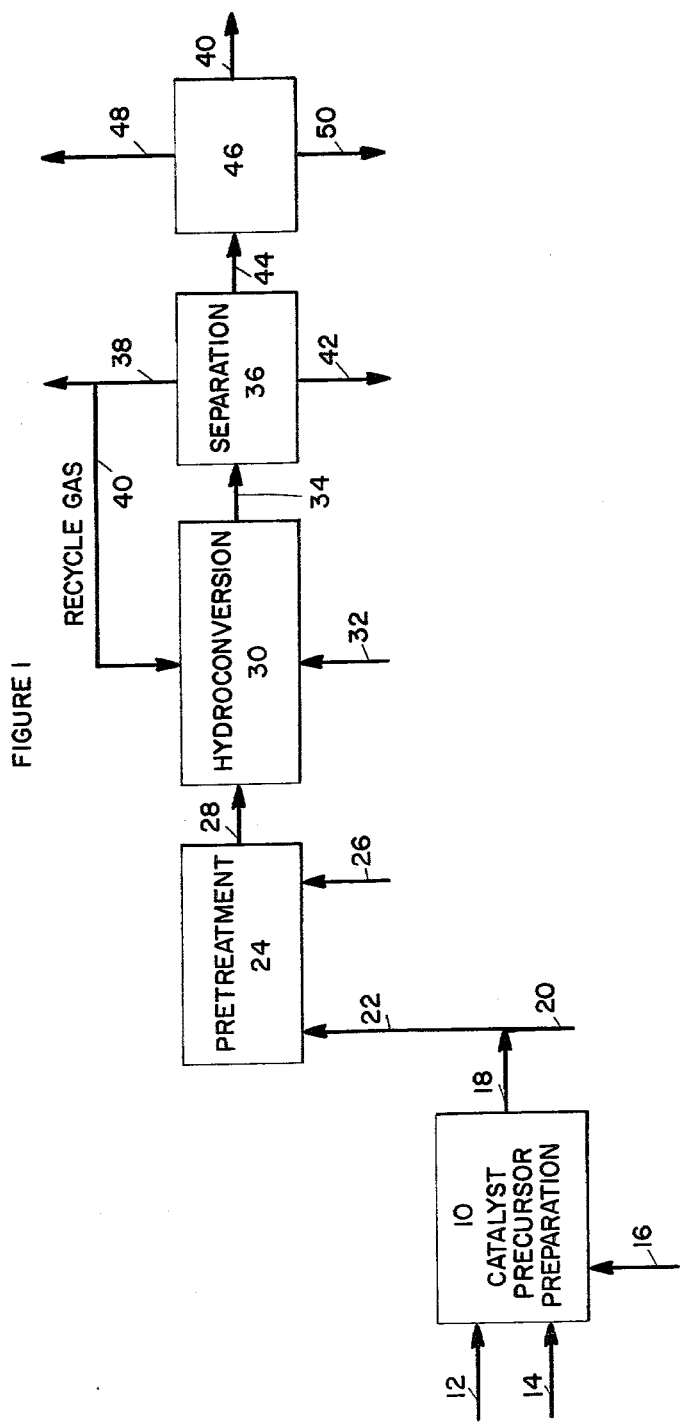
FIG. 1 is a schematic flow plan of one embodiment of the invention.

The process of the invention is generally applicable for the hydroconversion of hydrocarbonaceous oils, coal and mixtures thereof. Suitable hydrocarbonaceous oil chargestocks include heavy mineral oils; whole or topped petroleum crude oils, including heavy crude oils; polynuclear aromatics such as asphaltenes; residual oils such as petroleum atmospheric distillation tower residua (boiling above 650° F.) and petroleum vacuum distillation tower residua (boiling above 1050° F.); tars; bitumen; tar sand oils; shale oils, and hydrocarbon oils derived from coal liquefaction processes. The term "coal" is used herein to designate a normally solid carbonaceous material including all ranks of coals, such as anthracite coal, bituminous coal, semibituminous coal, sub-bituminous coal, lignite, peat and mixtures thereof. The process is applicable for the simultaneous hydroconversion of mixtures of coal and a hydrocarbonaceous oil.

A method of preparing the catalyst of the present invention comprises mixing phosphoric acid and an inorganic poly acid selected from the group consisting of isopoly acids and heteropoly acids and salts thereof wherein said poly acid comprises at least one metal constituent selected from the group consisting of molybdenum and tungsten. Suitable poly acids include phosphomolybdic acid (a heteropoly acid), ammonium heptamolybdate (a salt of an isopoly acid), and the like. The phosphoric acid is added to the poly acid in an amount sufficient to provide a ratio of about 0.5 to about 3.5 atoms of phosphorus (total phosphorus present) to 1 atom of said metal constituent, that is, to one atom of molybdenum, or tungsten. If both molybdenum and tungsten are present, the given ratio of phosphorus would apply per atom of the mixture of tungsten and molybdenum. Preferably the ratio of phosphorus to 1 atom of said metal constituent is from about 1 to about 3 atoms of phosphorus per atom of said metal constituent, more preferably from about 1.5 to about 2.5 atoms of phosphorus per atom of said metal constituent. Generally the poly acid and phosphoric acid are dissolved in a liquid medium. Suitable liquid media include water, alcohols, ethers and similar solvents. The solution of phosphoric acid and poly acid (catalyst precursor solution) is added to a carbonaceous chargestock. A sufficient amount of said solution is added to said carbonaceous chargestock to provide at least about 10 wppm of said metal constituent (i.e. molybdenum, tungsten or mixtures thereof), calculated as the elemental metal, based on the initial carbonaceous chargestock. Suitable amounts of metal constituent concentration in the initial chargestock include up to about 10 weight percent. Preferably, the solution is added to the carbonaceous chargestock in an amount sufficient to provide from about 10 to about 950 weight parts per million (wppm) of said metal constituent based on said carbonaceous chargestock, more preferably from about 50 to about 300 wppm metal constituent, most preferably from about 50 to about 200 wppm of said metal constituent, based on the initial carbonaceous chargestock.

In addition, if desired, other metal components of Groups IVB through VIII of the Periodic Table of Elements which are catalytically active under process conditions may be added to the liquid medium comprising the poly acid and phosphoric acid. The resulting solution may be added to the carbonaceous chargestock to form a catalyst in situ in the chargestock. For example, a Group VIII metal component, such as cobalt and/or nickel component may be added to the liquid medium or to the carbonaceous chargestock.

The solution of poly acid and phosphoric acid is added to the carbonaceous oil chargestock and dispersed in the chargestock. To form the catalyst, the poly acid-phosphoric acid solution is heated with the carbonaceous chargestock under the conditions of the present invention. If an additional Group IVB through Group VIII metal component is added to the solution, the resulting catalyst also comprises the corresponding metal constituent of the metal component.

Various methods can be used to convert the dispersed poly acid-phosphoric acid in situ in the carbonaceous chargestock to an active catalyst. A preferred method (pretreatment method) of forming a catalyst from the combination of phosphoric acid and poly acid in the carbonaceous chargestock is to heat the carbonaceous chargestock comprising the poly acid and phosphoric acid to a temperature ranging from about 325° to about 415° C. and at a pressure ranging from about 500 to 5000 psig in the presence of a hydrogen-containing gas. Preferably, the hydrogen-containing gas also comprises hydrogen sulfide. The hydrogen sulfide may comprise from about 1 to about 90 mole percent, preferably from about 1 to about 50 mole percent, more preferably from about 1 to about 30 mole percent, of the hydrogen-containing gas mixture. The pretreatment is conducted for a period ranging from about 5 minutes to about 2 hours, preferably for a period ranging from about 10 minutes to about 1 hour. The thermal treatment in the presence of hydrogen or in the presence of hydrogen and hydrogen sulfide is believed to facilitate conversion of the poly acid and phosphoric acid to an active catalyst comprising molybdenum or tungsten. The catalysts act as coking inhibitors. The carbonaceous chargestock containing the resulting catalyst is then introduced into a hydroconversion zone which will be subsequently described.

Another method of converting in situ in the chargestock the poly acid and phosphoric acid to a catalyst is to react the mixture of poly acid and phosphoric acid and carbonaceous chargestock with a hydrogen-containing gas at hydroconversion conditions to produce a catalyst in the chargestock in situ in the hydroconversion zone. The hydrogen-containing gas may comprise from about 1 to about 10 mole percent hydrogen sulfide, preferably from about 2 to about 6 mole percent hydrogen sulfide. The thermal treatment of the combination phosphoric acid-poly acid and reaction with the hydrogen-containing gas or with the hydrogen and hydrogen sulfide produces the corresponding molybdenum- or tungsten-containing conversion product which is an active catalyst. Whatever the exact nature of the resulting conversion product, the resulting molybdenum- or tungsten-containing product is a catalytic agent and a coking inhibitor.

The hydroconversion zone is maintained at a temperature ranging from about 343° to 538° C. (650° to 1000° F.), preferably from about 426° to 482° C. (799° to 900° F.), more preferably from about 440° to 468° C. (824° to 878° F.) and at a hydrogen partial pressure ranging from about 500 to about 5000 psig, preferably from about 1000 to about 3000 psig. Contact of the carbonaceous chargestock and catalyst under hydroconversion conditions in the reaction zone with the hydrogen-containing gas produces a normally liquid hydrocarbonaceous oil product. The hydroconversion zone oil product containing solids is removed from the hydroconversion reaction zone. The solids may be separated from the hydroconversion zone oil product by conventional means, for example, by settling or centrifuging or filtration of the slurry. At least a portion of the separated solids or concentrate may be recycled directly to the hydroconversion zone or recycled to the chargestock. The space velocity, defined as volumes of carbonaceous chargestock per hour per volume of reactor (V/Hr/V) may vary widely depending on the desired hydroconversion level. Suitable space velocities may range broadly from about 0.1 to 10 volumes of oil feed per hour per volume of reactor, preferably from about 0.25 to 6. The process of the invention may be conducted as a batch process or as a continuous type operation.

DESCRIPTION OF THE PREFERRED EMBODIMENT

The preferred embodiment will be described with reference to FIG. 1.

Referring to FIG. 1, phosphomolybdic acid is introduced into catalyst precursor preparation zone 10 by line 12. Water is introduced into zone 10 by line 14. Phosphoric acid is introduced into zone 10 by line 16. The amounts of phosphomolybdic acid ($H_3PO_4:10MoO_3:24H_2O$) and phosphoric acid introduced into zone 10 are such as to provide an atomic ratio of phosphorus to molybdenum in the solution of 1 to 3 atoms of phosphorus to 1 atom of molybdenum. The atoms of phosphorus refer to the total amount of phosphorus present in the solution, that is, phosphorus derived from the phosphoric acid as well as phosphorus derived from the phosphomolybdic acid. A portion of the resulting catalyst precursor solution comprising phosphomolybdic acid and phosphoric acid is removed from zone 10 by line 18 and introduced into line 20 which carries a petroleum atmospheric residuum, that is, an oil fraction having an atmospheric pressure boiling point of 650° F.+(343.3° C.+). The amount of catalyst precursor solution introduced into the residuum is such that the molybdenum present in the solution is less than 500 weight parts per million, calculated as if it existed as the elemental metal, based on the initial residuum chargestock. The residuum comprising the added catalyst precursor solution is introduced by line 22 into pretreatment zone 24 into which a gaseous mixture comprising hydrogen and from about 1 to about 50 mole percent of hydrogen sulfide is introduced by line 26. The pretreatment zone is maintained at a temperature ranging from about 325° C. to about 415° C. and at a total pressure ranging from about 500 to about 5000 psig. The pretreatment is conducted for a period of time ranging from about 10 minutes to about 1 hour. The pretreatment zone effluent is removed by line 28. If desired, a portion of the hydrogen sulfide may be removed from the effluent. The pretreatment zone effluent is introduced by line 28 into hydroconversion reactor 30 at a space velocity of 0.5 to 2 volumes of feed per hour per volume of reactor. The hydrogen-containing gas is introduced into hydroconversion reactor 30 by line 32. The hydroconversion reaction zone in reactor 30 is maintained at a temperature ranging from about 799° to 874.4° F. (426° to 468° C.) and under a hydrogen partial pressure ranging from about 1000 to about 3000 psig. The hydroconversion reactor effluent is removed from the zone by line 34. The effluent comprises gases, normally liquid hydrocarbon products and a solid residue.

The effluent is passed to a separation zone 36 from which gases are removed overhead by line 38. This gas may be scrubbed by conventional methods to remove any undesired amount of hydrogen sulfide and carbon monoxide and thereafter, the scrubbed gas may be recycled into the hydroconversion zone by line 40 to provide at least a portion of the required hydrogen-containing gas. The solids are removed from separation zone 36 by line 42. The liquids are removed from separation zone 36 by line 44 and passed to a fractionation zone 46 wherein a light fraction is recovered by line 48, a heavy fraction is removed by line 50 and an intermediate fraction is removed by line 40. Alternatively the effluent of the hydroconversion zone may be separated as shown in U.S. Pat. No. 4,066,530, which is hereby incorporated by reference.

The following examples are presented to illustrate the invention.

EXAMPLE 1

Experiments were made utilizing Cold Lake crude and phosphoric acid plus phosphomolybdic acid as catalyst precursor at various atomic ratios of phosphorus to molybdenum in several runs. The catalyst precursor solution comprised 16.5 weight percent phosphomolybdic acid in aqueous phosphoric acid solution. The molybdenum concentration in each run, based on the initial Cold Lake crude chargestock, was 350 weight parts per million. The mixture of Cold Lake crude and catalyst precursor solution was pressured to 2000 psig at room temperature with hydrogen and pretreated 30 minutes at 725° F. The temperature was then raised to 820° F. and the pretreated crude was hydroconverted at this temperature for 60 minutes. The results of these experiments are summarized in FIG. 2.

Figure 2:
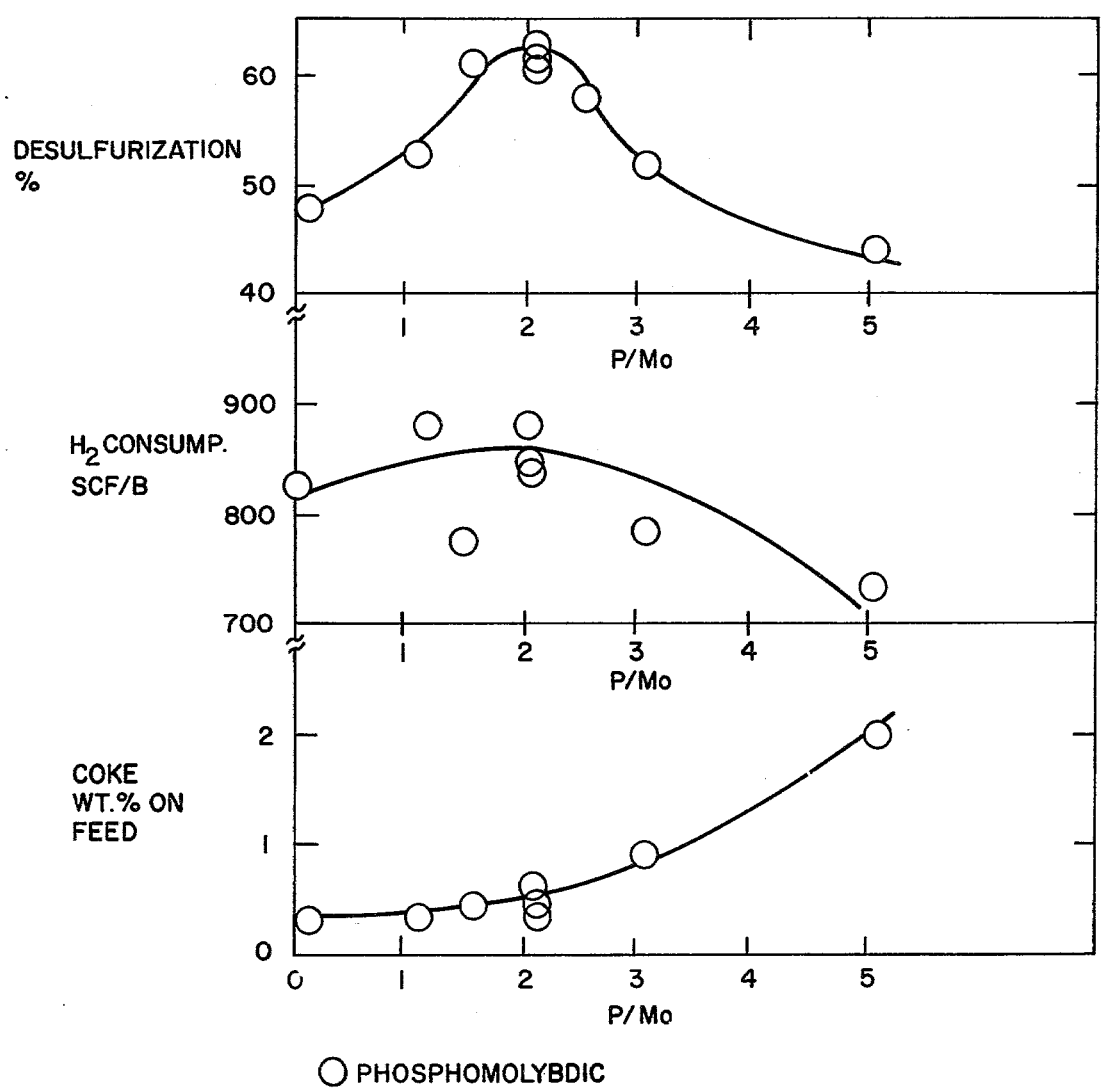
FIG. 2 is a plot showing the phosphorus to molybdenum ratio relative to the amount of desulfurization, hydrogen consumption and coke yield.

As can be seen from FIG. 2, the runs utilizing phosphoric acid plus phosphomolybdic acid at an atomic ratio of 1.1 to 3.1 atoms of phosphorus to 1 atom of molybdenum showed better desulfurization activity than the other runs.

EXAMPLE 2

Hydroconversion experiments were made with Cold Lake crude similar to the procedure used in Example 1. In this series of tests, the effect of a Group VIII promoter metal was determined. The catalyst precursor in run 419 was phosphoric acid plus phosphomolybdic acid at a 2.1 phosphorus to 1 molybdenum atomic ratio. In comparative runs (runs 420 and 427), cobalt was added as the nitrate to the aqueous catalyst precursor solution in the amount of 0.5 atom of cobalt per atom of molybdenum. The molybdenum concentration on oil feed was 350 weight parts per million in each of these runs. The mixture of feed and catalyst precursor solution was pressured in a stirred autoclave at room temperature to 100 psia with $H_2S$, then to 2100 psia with hydrogen, heated to 725° F. and pretreated at this temperature for 30 minutes. The temperature was then raised to 820° F. at which temperature the hydroconversion was conducted for the time shown. The result of these experiments are summarized in Table I.

TABLE I

| Run No. | 419 | 420 | 427 |
|---|---|---|---|
| Run Length, Hr. | 1 | 1 | 2 |
| Co/Mo, Atom Ratio | 0.00 | 0.50 | 0.50 |
| $C_{1-4}$ Gas, % | 2.88 | 2.87 | 3.81 |
| Coke, % | 0.46 | 0.46 | 0.42 |
| $H_2$ Consumption, SCF/Bbl. | 879 | 896 | 982 |
| API Gravity, 60° F. | 25.5 | 25.9 | 28.7 |
| Con. Carbon Conversion, % | 63 | 60 | 70 |
| Desulfurization, % | 64 | 69 | 82 |

As can be seen from Table I, the addition of cobalt to 2.1 P/Mo catalyst increased desulfurization activity. The cobalt-containing 2.1 P/1Mo catalyst system also retained its desulfurization activity at relatively high hydroconversion levels.

EXAMPLE 3

This example illustrates that the activity of the molybdenum-containing catalyst generated in situ (in residua type feed) from ammonium heptamolybdate, an isopoly acid salt of molybdenum, can be greatly improved by adding phosphoric acid to the ammonium heptamolybdate to obtain a P/Mo atomic ratio within the preferred range of 1 to 3. Composition of the catalyst precursor blends used is given in Table II. For each run a sufficient amount of blend was added to the oil feed to achieve a molybdenum concentration on feed of 1450 wppm. The feed for this hydroconversion study was topped (850° F.+) Cold Lake crude. For a given hydroconversion run the requisite amount of catalyst blend and Cold Lake crude were charge to a batch autoclave reactor, which was then pressured at room temperature with $H_2S$ to 50 psia and then with hydrogen to a total reactor pressure of 2050 psia. The reactor was then heated with stirring to a temperature of 800° F. and held there for a period of 60 minutes to carry out the hydroconversion reaction. At the end of this period the reactor was cooled rapidly to room temperature and the contents were recovered and analyzed. As noted in the table, desulfurization, Conradson carbon conversion and coke suppression obtained with the phosphorus-containing catalyst (Run 60-R-68) was much superior to that obtained with ammonium heptamolybdate alone (Run 30-R-69).

TABLE II

| Run No. | 60-R-68 | 30-R-69 |
|---|---|---|
| Catalyst Precursor Blend Composition, Wt. % | | |
| $(NH_4)_6MO_7O_{24}4H_2O$ | 14.7 | 14.7 |
| $H_3PO_4(85\%)$ | 18.9 | 0.0 |
| Water | 66.4 | 85.2 |
| P/Mo atomic ratio | 1.96 | — |
| Yields, Wt. % on Feed | | |
| $C_{1-4}$ | 2.2 | — |
| Coke | 0.8 | 1.4 |
| Desulfurization, % | 58 | 46 |
| Conradson Carbon Conv., % | 50 | ~41 |

What is claimed is:

1. In a process for the hydroconversion of a carbonaceous material which comprises:
   (a) forming a mixture of said carbonaceous material and a poly acid selected from the group consisting of isopoly acids and heteropoly acids and salts thereof, wherein said poly acid comprises at least one metal constituent selected from the group consisting of molybdenum and tungsten;
   (b) converting said poly acid to a catalyst within said mixture in the presence of a hydrogen-containing gas by heating said mixture to an elevated temperature;
   (c) reacting the resulting mixture containing said catalyst with hydrogen under hydroconversion conditions; and
   (d) recovering a normally liquid hydrocarbon product, the improvement which comprises: adding said poly acid and phosphoric acid, to said mixture said phosphoric acid being added in an amount such as to provide a ratio from about 0.5 to about 3.5 atoms of phosphorus per one atom of said metal constituent, said catalyst of step (b) being the conversion product of said phosphoric acid and said poly acid.

2. The process of claim 1 wherein said ratio ranges from about 1 to 3 atoms of phosphorus per atom of said metal constituent.

3. The process of claim 1 wherein said ratio ranges from about 1.5 to about 2.5 atoms of phosphorus per atom of said metal constituent.

4. The process of claim 1 wherein said poly acid and said phosphoric acid are added to said mixture in a liquid medium.

5. The process of claim 1 wherein said poly acid comprises a molybdenum constituent.

6. The process of claim 1 wherein said poly acid comprises a tungsten constituent.

7. The process of claim 1 wherein said poly acid is phosphomolybdic acid.

8. The process of claim 1 wherein said poly acid is present in an amount sufficient to provide at least about 10 wppm of said metal constituent, based on the initial carbonaceous chargestock.

9. The process of claim 1 wherein said poly acid is present in an amount sufficient to provide from about 10 wppm to about 10 weight percent of said metal constituent, based on the initial carbonaceous chargestock.

10. The process of claim 1 wherein said poly acid is present in an amount sufficient to provide from about 10 to about 950 wppm of said metal constituent based on said initial carbonaceous chargestock.

11. The process of claim 1 wherein said hydrogen-containing gas of step (b) comprises from about 1 to about 90 mole percent hydrogen sulfide.

12. The process of claim 1 wherein said polyacid and phosphoric acid are converted to a catalyst by first heating said mixture of polyacid, phosphoric acid and carbonaceous material to a temperature ranging from about 325° to about 415° C. in the presence of said hydrogen-containing gas to form a catalyst within said mixture and, subsequently, reacting the resulting mixture containing the catalyst with hydrogen under hydroconversion conditions.

13. The process of claim 1 wherein said polyacid is converted to a catalyst in the presence of a hydrogen-containing gas at hydroconversion conditions including a temperature ranging from about 416° to about 538° C., thereby forming said catalyst in situ in said mixture.

14. The process of claim 1 wherein said hydroconversion conditions include a temperature ranging from about 416° to about 538° C. and a hydrogen pressure of at least 500 psig.

15. The process of claim 1 wherein said carbonaceous material is selected from the group consisting of hydrocarbonaceous oils, coal and mixtures thereof.

16. The process of claim 1 wherein said carbonaceous material is a hydrocarbonaceous oil.

17. The process of claim 1 wherein said carbonaceous material is coal.

18. The process of claim 1 wherein said carbonaceous material comprises a mixture of a hydrocarbonaceous oil and coal.

19. The process of claim 1 wherein an additional Group IVB through Group VIII metal component is added to said mixture of step (a), said Group IVB through Group VIII metal component being selected from the group of metal components having catalytic activity under process conditions.

20. The process of claim 1 wherein a Group VIII metal component is added to said mixture of step (a) and wherein the resulting catalyst comprises the Group VIII metal constituent of said metal component.

21. The process of claim 1 wherein said poly acid is ammonium heptamolybdate.

22. The process of claim 4 wherein said liquid medium is selected from the group consisting of water, and organic solvents.

23. The process of claim 6 wherein said hydrogen-containing gas also comprises hydrogen sulfide.

24. The process of claim 4 wherein said liquid medium is selected from the group consisting of water, alcohols, ether and mixtures thereof.

25. A process for the hydroconversion of a carbonaceous material, which comprises:
(a) forming a mixture of said carbonaceous material, phosphoric acid and phosphomolybdic acid, said phosphoric acid being present in an amount sufficient to provide from about 1 to about 3 atoms of phosphorus per atom of the molybdenum constituent of said phosphomolybdic acid;
(b) heating said mixture to an elevated temperature in the presence of a hydrogen-containing gas to convert said phosphoric acid and phosphomolybdic acid to a catalyst;
(c) reacting the resulting mixture containing said catalyst with hydrogen under hydroconversion conditions; and
(d) recovering a normally liquid hydrocarbon product.

* * * * *